United States Patent
Nekrestyanov et al.

(10) Patent No.: US 10,042,626 B2
(45) Date of Patent: Aug. 7, 2018

(54) SOFTWARE UPDATES USING CLIENT SELF-REPORTING AND A HIERARCHICAL DATA STRUCTURE

(71) Applicant: Verizon Patent and Licensing Inc., Arlington, VA (US)

(72) Inventors: Igor Nekrestyanov, Santa Clara, CA (US); Thomas Van Chung Ng, San Francisco, CA (US); Timothy M. Perrett, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 14/753,597

(22) Filed: Jun. 29, 2015

(65) Prior Publication Data
US 2016/0378454 A1     Dec. 29, 2016

(51) Int. Cl.
*G06F 9/45*     (2006.01)
*G06F 8/65*     (2018.01)
*H04L 29/08*    (2006.01)

(52) U.S. Cl.
CPC ............... *G06F 8/65* (2013.01); *H04L 67/34* (2013.01)

(58) Field of Classification Search
CPC .................. G06F 8/60–8/68; H04L 67/34
See application file for complete search history.

(56) References Cited

U.S. PATENT DOCUMENTS

| | | | | |
|---|---|---|---|---|
| 7,191,435 B2* | 3/2007 | Lau | ........................... | G06F 8/65 714/38.1 |
| 7,328,434 B2* | 2/2008 | Swanson | ................. | G06F 8/665 709/220 |
| 7,415,706 B1* | 8/2008 | Raju | .................... | G06F 9/44536 717/170 |
| 7,480,907 B1* | 1/2009 | Marolia | ..................... | G06F 8/65 717/127 |
| 7,620,392 B1* | 11/2009 | Maurya | ...................... | G06F 8/65 455/418 |
| 7,716,661 B2* | 5/2010 | Paul | ........................... | G06F 8/65 717/168 |
| 7,904,608 B2* | 3/2011 | Price | ......................... | G06F 8/65 710/10 |
| 8,032,634 B1* | 10/2011 | Eppstein | ................. | H04L 67/34 709/226 |
| 8,352,428 B2* | 1/2013 | Wood | ................ | G01R 31/31835 707/638 |
| 8,706,919 B1* | 4/2014 | Eisner | ..................... | H04L 67/34 700/94 |

(Continued)

*Primary Examiner* — Ziaul A Chowdhury (57) ABSTRACT

A client device forwards data about itself to an update device. The client metadata may identify hardware components included in the client, software being executed by the client, or other information, such as a geographic location associated with the client device and/or account information for associated operator. The update device determines metadata regarding various software updates, such as data identifying different versions of available updates and logical rules for selecting among the versions. The update device selects specific update versions for the client device, and forwards data identifying the selected updates to the client device. The client device uses the identifying data to locate and obtain the identified updates. The client device may access the updates via a content delivery network that schedules delivery of the updates to the client device.

17 Claims, 8 Drawing Sheets

| UPDATE IDENTIFIER COLUMN (310) | VERSION IDENTIFIER COLUMN (320) | VERSION TIME IDENTIFIER COLUMN (330) | USE INDICATOR COLUMN (340) | USE LOGIC COLUMN (350) | OTHER METADATA COLUMN (360) |
|---|---|---|---|---|---|
| UPDATE A | VERSION 1 | TIME A-1 | USABLE | | REQUIRES UPDATE B |
| UPDATE A | VERSION 2 | TIME A-2 | UNUSABLE | | |
| UPDATE A | VERSION 3 | TIME A-3 | USABLE | USE IF CLIENT DEVICE IS AT LOCATION 1 | INCOMPATIBLE WITH UPDATE B VERSION 2 |
| UPDATE B | VERSION 1 | TIME B-1 | USABLE | USE IF USER OF DEVICE HAS A CHARACTERISTIC | |
| UPDATE B | VERSION 2 | TIME B-2 | USABLE | USE FOR DEVICE TYPE 1 OR IF DEVICE INCLUDES COMPONENT 1 | USE WITH VERSION 1 OF UPDATE A |
| ⋮ | ⋮ | ⋮ | ⋮ | | ⋮ |

300

(56) References Cited

U.S. PATENT DOCUMENTS

| | | | |
|---|---|---|---|
| 8,825,815 B2* | 9/2014 | Gidron | H04L 67/34 709/221 |
| 2003/0140134 A1* | 7/2003 | Swanson | G06F 8/665 709/223 |
| 2003/0218628 A1* | 11/2003 | Deshpande | G06F 9/4446 715/738 |
| 2005/0071385 A1* | 3/2005 | Rao | G06F 8/65 |
| 2005/0086328 A1* | 4/2005 | Landram | H04L 67/34 709/220 |
| 2005/0132349 A1* | 6/2005 | Roberts | G06F 8/65 717/168 |
| 2005/0246702 A1* | 11/2005 | Yeh | G06F 8/65 717/170 |
| 2006/0026304 A1* | 2/2006 | Price | G06F 8/65 710/8 |
| 2006/0048141 A1* | 3/2006 | Persson | G06F 8/61 717/176 |
| 2006/0106806 A1* | 5/2006 | Sperling | G06F 8/65 |
| 2006/0112151 A1* | 5/2006 | Manley | G06F 17/30212 |
| 2006/0230395 A1* | 10/2006 | Paul | G06F 8/65 717/173 |
| 2006/0277209 A1* | 12/2006 | Kral | A63F 13/12 |
| 2008/0052279 A1* | 2/2008 | Marolia | G06F 8/65 |
| 2008/0091815 A1* | 4/2008 | Rao | G06F 8/65 709/223 |
| 2009/0187901 A1* | 7/2009 | Kanai | G06F 8/65 717/173 |
| 2009/0260004 A1* | 10/2009 | Datta | G06F 8/65 717/175 |
| 2009/0300596 A1* | 12/2009 | Tyhurst | G06F 8/65 717/173 |
| 2010/0088278 A1* | 4/2010 | Wood | G06F 11/263 707/638 |
| 2010/0251231 A1* | 9/2010 | Coussemaeker | G06F 8/61 717/176 |
| 2012/0005156 A1* | 1/2012 | Grant | G06F 17/2288 707/608 |
| 2012/0110564 A1* | 5/2012 | Ran | G06F 8/65 717/173 |
| 2012/0278454 A1* | 11/2012 | Stewart | H04L 67/34 709/220 |
| 2013/0019236 A1* | 1/2013 | Nakagawa | G06F 8/65 717/170 |
| 2013/0024851 A1* | 1/2013 | Firman | G06F 8/60 717/170 |
| 2014/0122862 A1* | 5/2014 | Ludwig | G06F 8/65 713/100 |
| 2014/0282485 A1* | 9/2014 | Nakamura | G06F 8/65 717/173 |
| 2015/0222595 A1* | 8/2015 | Reddy | H04L 61/2528 709/226 |
| 2015/0286479 A1* | 10/2015 | Oberheide | G06F 17/30477 717/122 |
| 2015/0347124 A1* | 12/2015 | Sotani | G06F 8/665 717/170 |
| 2016/0092189 A1* | 3/2016 | Pollack | G06F 8/65 717/175 |

* cited by examiner

| UPDATE IDENTIFIER COLUMN (310) | VERSION IDENTIFIER COLUMN (320) | VERSION TIME IDENTIFIER COLUMN (330) | USE INDICATOR COLUMN (340) | USE LOGIC COLUMN (350) | OTHER METADATA COLUMN (360) |
|---|---|---|---|---|---|
| UPDATE A | VERSION 1 | TIME A-1 | USABLE | | REQUIRES UPDATE B |
| UPDATE A | VERSION 2 | TIME A-2 | UNUSABLE | | |
| UPDATE A | VERSION 3 | TIME A-3 | USABLE | USE IF CLIENT DEVICE IS AT LOCATION 1 | INCOMPATIBLE WITH UPDATE B VERSION 2 |
| UPDATE B | VERSION 1 | TIME B-1 | USABLE | USE IF USER OF DEVICE HAS A CHARACTERISTIC | |
| UPDATE B | VERSION 2 | TIME B-2 | USABLE | USE FOR DEVICE TYPE 1 OR IF DEVICE INCLUDES COMPONENT 1 | USE WITH VERSION 1 OF UPDATE A |
| ⋮ | ⋮ | ⋮ | ⋮ | | ⋮ |

SOFTWARE UPDATES USING CLIENT SELF-REPORTING AND A HIERARCHICAL DATA STRUCTURE

BACKGROUND INFORMATION

In computer programming, a software upgrade of a device may include modified code, driver, an application programming interface (API), and/or an application. The upgrade may add new features, improve performance and stability, or fix bugs in a previous software version. For example, a software upgrade may include a patch that modifies the software to address an error identified in a prior version of the software. In another example, a software upgrade may include new code to enable a new feature. An update may be obtained by a device, for example, via a website or a file transfer protocol (FTP) device. Alternatively, the developer may forward the update to the device based on stored information associated with the device. For example, the developer may store a list of devices running an application or that include particular hardware, and the developer may forward a software update to the identified devices.

DETAILED DESCRIPTION OF PREFERRED EMBODIMENTS

The following detailed description refers to the accompanying drawings. The same reference numbers in different drawings identify the same or similar elements.

In certain implementations, a client device may forward metadata about the client device to another device, such as an update device. The client metadata may identify, for example, hardware components included in the client device, software being executed by the client device, a geographic location associated with the client device, and/or account information for a user associated with a user of the client device. The update device may access metadata regarding various software updates. The metadata may include, for example, information identifying different versions of available updates, and logical rules for selecting among the update versions. The update device may select one or more specific update versions for the client device based on the client metadata and the update metadata, and may forward data identifying the selected updates to the client device. The client device may use the identifying data to locate and obtain the selected updates. For example, the client device may access the updates via a content delivery network that schedules delivery of the updates based on network conditions, the criticality of the updates, information associated with the operator of the client device, etc.

Figure 1A:
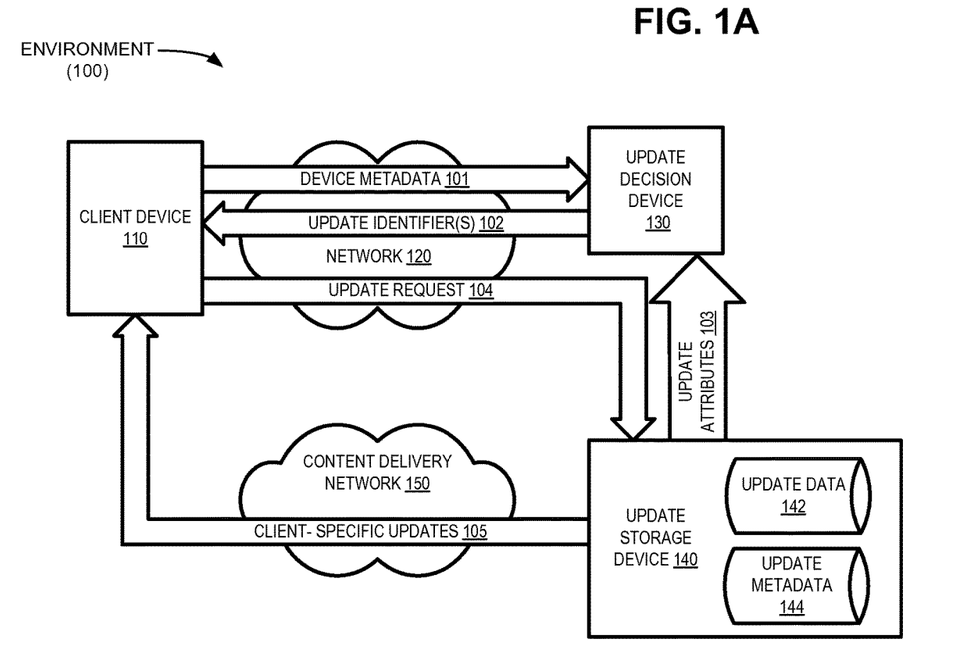
FIGS. 1A and 1B are diagrams showing components of an exemplary environment in which the systems and/or methods described herein may be implemented.
Figure 1B:
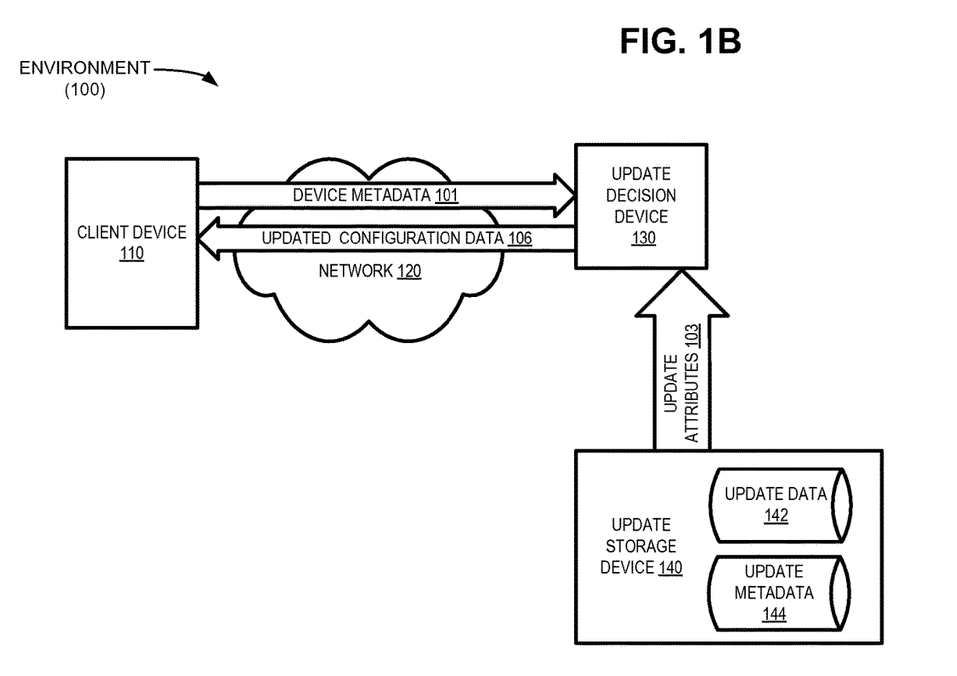

FIGS. 1A and 1B are diagrams showing an exemplary environment 100 in which the systems and/or methods described herein may be implemented. As shown in FIG. 1A, environment 100 may include a client device 110, a network 120, an update decision device 130, an update storage device 140, and a content delivery network (CDN) 150.

Client device 110 may include a computational or communication device that interacts with update decision device 130 and/or update storage device 140 to obtain client-specific updates 105. Different types of client device 110 may include, for example, a smart phone, a personal communications system (PCS) terminal, a tablet computer, a personal computer, a laptop computer, a gaming console, an Internet television, or other types of computational or communication devices such as a set-top box (STB), a smart TV or other device (e.g., a digital video recorder or a media player) that communicates via network 120 and/or CDN 150.

As shown in FIG. 1A, client device 110 may forward device metadata 101 to update decision device 130 via network 120. Device metadata 101 may be included in some type of self-reporting message sent from client device 110. For example, client device 110 may periodically check-in into update decision device 130. Client device 110 may forward device metadata 101 to update decision device 130 in response to some type of prompt or signal (not shown) sent from update decision device 130. For example, update decision device 130 may direct client device 110 to forward device metadata 101 when new updates are received by update storage sever 140. Additionally or alternatively, software on client device 110 may cause client device 110 to forward device metadata 101. For example, the software may cause client device 110 to forward device metadata 101 periodically (e.g., once a week), when certain actions are performed (e.g., when an application is used), when certain types of events occur (e.g., after an error occurs on client device 110), etc.

Device metadata 101 may include information associated with client device 110. For example, device metadata 101 may include information identifying a serial number, manufacturer, model, internet protocol (IP) address, telephone number, a device type, location, supported functions/features, etc. associated with client device 110. Device metadata 101 may further include, for example, information identifying one or more hardware component in client device 110 and/or software on client device 110. Device metadata 101 may also include information identifying the versions of software on client device 110 and/or information identifying when the software on client device 110 was previously updated. Device metadata 101 may also include information associated with a user, such as a user name, account number, account type, user location, activities of the user on client device 110, etc.

Network 120 may include a local area network (LAN), a wireless LAN (WLAN) (e.g., an 802.11 network), a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, and/or a Worldwide Interoperability for Microwave Access (WiMAX) network, etc.). Additionally, or alternatively, network 120 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network. In other implementation, network 120 may correspond to a personal area network ("PAN"), aWLAN based on the International Electrical and Electronics Engineers 802.11 protocol (e.g., Wi-Fi®), or other short-range network via which client device 110 may communicate with update decision device 130 and/or update storage device 140 via an intermediate access point (not shown). For example, client device 110 and the access point may communicate via Bluetooth®, Wi-Fi®, and/or another connection technology.

Update decision device 130 may identify one or more software updates (or any) for client device 110 based on device metadata 101. For example, update decision device 130 may receive update attributes 103 identifying available updates and logic rules for applying the updates. Update decision device 130 may further determine, based on device metadata 101, whether an update is applicable to a device. For example, update decision device 130 may identify an application associated with an update and may determine, based on device metadata 101, whether the application is present on client device 110.

If two or more versions of an update are available for an application on client device 110, update decision device 130 may further select one of the versions for client device 110. For example, update decision device 130 may select a newest (e.g., most recently generated) version. Additionally or alternatively, update decision device 130 may select a version of the update that is compatible with the software and/or hardware present on client device 110. In another example, if multiple updates are to be installed on client device 110, update decision device 130 may select versions of the multiple updates that are compatible with each other.

Update decision device 130 may forward, to client device 110, update identifiers 102 that include information identifying the selected software updates. For example, update decision device 130 may include, in update identifiers 102, data identifying the versions of updates to be installed on client device 110. Update identifiers 102 may further include information that enables client device 110 to obtain client-specific updates 105, such as a storage address or a universal resource locator (URL) for obtaining client-specific updates 105 from update storage device 140. Update identifiers 102 may also include authentication data and/or information that enables client device 110 to use client-specific updates 105, such as a decryption code, data identifying an encoding/decoding protocol, etc. Update identifiers 102 may further include instruction data related to the installation of the client-specific updates 105 on client device 110. For example, update identifiers 102 may identify a time when client device 110 should obtain client-specific updates 105 for update storage sever 140, an order to install client-specific updates 105, etc.

In one implementation, update decision device 130 may obtain update attributes 103 from update storage device 140 and determine update identifiers 102 based on the update attributes 103. Update attributes 103 may be generated by update storage device 140 based on update metadata 144. Update metadata 144 may identify attributes of update data 142 stored at or accessed by update storage device 140. For example, update metadata 144 may include information identifying software applications associated with update data 142. Update metadata 144 may further identify versions of the updates and attributes associated with the different updates/versions. For example, update metadata 144 may identify times when the updates versions were created and/or received by update storage device 140. Update metadata 144 may further identify which of the updates versions can be used and which of the update versions are not usable. For example, update metadata 144 may indicate whether certain update versions have been sufficiently tested and/or whether certain update versions are compatible with different hardware/software associated with client device 110. Update attributes 103 may include a portion of update metadata 144, such as data associated with one or more versions of the updates.

Client device 110 may generate update request 104 based on update identifiers 102 and may forward update request 104 to update storage device 140. Update request 104 may include, for example, information identifying versions of updates (e.g., versions identified in update identifiers 102) and other information that may be used by update storage device 140 to verify updated request 104. For example, update request 104 may include information identifying client device 110 and a password or other authentication data.

Update storage device 140 may evaluate the contents of update request 104 and may forward, as client-specific updates 105, appropriate update versions from update data 142. For example, update storage device 140 may identify portions of update data 142 identified in update request 104, and update storage device 140 may forward, as client-specific updates 105, the identified portions of update data 142 to client device 110. Update storage device 140 may forward client-specific updates 105 to client device 110 via CDN 150. For example, update storage device 140 may schedule delivery of client-specific updates 105 to client device 110 based on conditions (e.g., congestion levels) in CDN 150, based on a status of client device 110 (e.g., whether client device is operational without client-specific updates 105 and/or being used for other functions), based on account data associated with a user of client device 110, etc.

In one implementation, update storage device 140 may correspond to a web site server and/or a file transfer protocol (FTP) device that selectively forwards the identified portions of update data 142 to client device 110.

CDN 150 may include a distributed system of devices or other computing devices deployed in data centers. For example, CDN 150 may include components to buffer client-specific updates 105 and other components to direct transmission of client-specific updates 105 between update storage device 140 and client device 110. CDN 150 may include a web cache to store popular content on devices that have the greatest demand for the content requested. CDN 150 may also use device-load balancing techniques to distribute client-specific update 105 among a number of devices or web caches. For example, CDN 150 may determine a path between update storage device 140 and client device 110 that includes multiple separate physical devices and/or nodes, and client-specific updates 105 may be transmitted via the path.

The client-specific updates 105 delivered to client device 110 may include binary files that are downloaded via CDN 150. In another implementation shown in FIG. 1B, update data 142 may include non-binary files. For example, upgrade data 142 may include configuration and/or setting data that may be used by client device 110 to modify code already present on client device 110. For example, in a multimedia access network, client device 110 (such as a set-top box) may use a URL in form of https://{CDN_host}/video-to-play.vod to play a video. Update decision device 130 may receive, as update attributes 103, different values for "CDN_host". When client device 110 boots up, client device 110 may interface with update decision device 130 to determine the value of the CDN_host. For example, client device 110 may forward device metadata 101 to update decision device 130. Update decision device 130 may return, as update configuration data 106, an updated CDN_host value and/or other configuration data. For example, update decision device 130 may evaluate device metadata 101 to identify a client location, a client id, or other device metadata associated with client device 110, and update decision device 130 may determine the CDN_host value and/or other configuration for client device 110 based device metadata 101. For example, update decision device 130 may forward a first CDN_host value to client device 110 if client device 110 is located in a particular region and a second, different CDN_host value if client device 110 located in a different region.

Although FIGS. 1A-1B show exemplary components of environment 100, in other implementations, environment 100 may include fewer components, different components, differently arranged components, or additional components than those depicted in FIGS. 1A-1B. For example, although environment 100 is shown in FIGS. 1A-1B as including different update decision device 130 and update storage device 140, functions described as being performed by update decision device 130 and update storage device 140 may be performed by a single device. Similarly, although network 120 and content delivery network 150 are shown in FIG. 1A as separate paths, it should be appreciated that network 120 and content delivery network 150 may share components, e.g., both update identifiers 102 and client-specific updates 105 may be forwarded to client device 110 via paths that include a same node. Additionally or alternatively, one or more components of environment 100 may perform functions described as being performed by one or more other components of environment 100.

Figure 2:
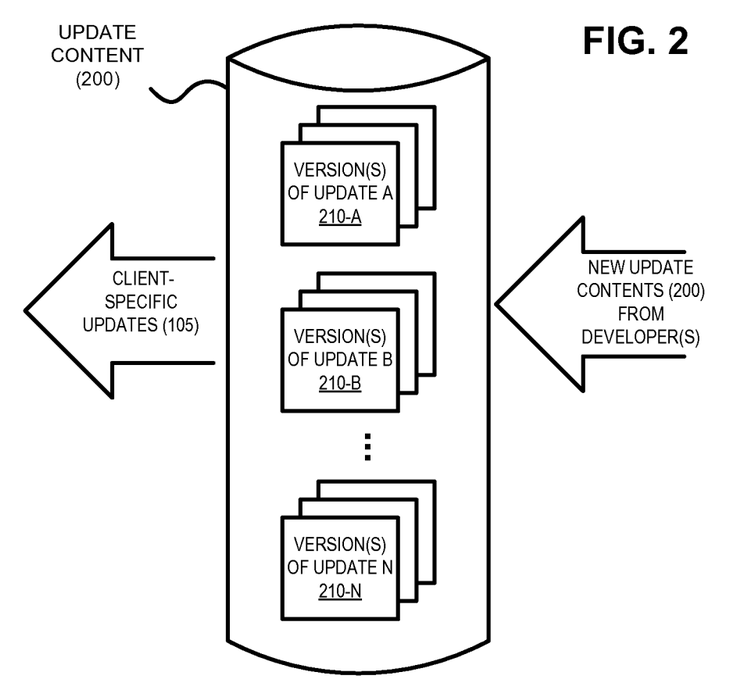
FIG. 2 is a diagram showing exemplary update contents that may be selectively provided in the environment shown in FIGS. 1A-1B.

FIG. 2 shows elements of exemplary update contents 200 that may be included in update data 142. For example, as shown in FIG. 2, update contents 200 may include versions 210-A of update A, versions 210-B of update B, and versions 210-N of update N (collectively referred to as versions 210 or individually as version 210). For example, update storage device 140 may receive a new version 210 of an update from a developer and may modify update contents 200 to include the new version 210. If a received version 210 is a first version of an update, update storage device 140 may modify update content 200 to include the first version. If a received, new version 210 is not a first version of an update, update storage device 140 may modify update content 200 to include the new version 210 and one or more prior versions 210. In this way, older update versions 210 are immutable and do not change, and update contents 200 may be modified to include new update versions 210.

In one implementation, an oldest version 210 of an update may be automatically deleted if, for example update contents 200 include more than a threshold number of versions of the update. For example, update storage device 140 may delete an oldest, an unused and/or a defective version 210. In another implementation, update storage device 140 may automatically (e.g., without receiving a user command) delete a version 210 of an update that has been stored in update contents 200 for more than a threshold amount of time or if the version 210 of the update has not been used (e.g., forwarded to a client device 110) during the threshold time period.

In one implementation, update metadata 144 may identify, for example, versions 210 of updates that are recommended and/or valid for client device 110 (e.g., available for access by a client device 110). In operation, upgrades versions 210 that are designated as "recommended" and/or "valid" may be marked to prevent update storage device 140 from deleting these versions. Additionally or alternatively, upgrades versions 210 that are designated as "used" (e.g., accessed during a threshold time period by a client device 110) may be marked to prevent update storage device 140 from deleting these versions 210.

As described in greater detail below, update contents 200 may include multiple different versions 210 of an update. In one example, an older version 210 of an update may be used while a newer version 210 of the update is being tested. In another example, a newer version 210 of an update may be used for a certain type of devices, while an older version 210 of the update may be used for another, different type of client device 110. In yet another example, an older version 210 of an update may be installed in connection with another update, and a newer version 210 of the update may be used when the other update is not being installed on client device 110.

Although FIG. 2 shows exemplary components of update content 200, in other implementations, content 200 may include fewer components, different components, differently arranged components, or additional components than those depicted in FIG. 2. For example, although FIG. 2 shows that update content 200 includes separate update versions 210 (e.g., as a collection of separate files storing versions 210), it should be appreciated that update content 200 may store components of update versions 210. For example, update content 200 may store a complete first version 210 of an update, and subsequent versions 210 of the update may include data identifying changes from the first version.

Figure 3:
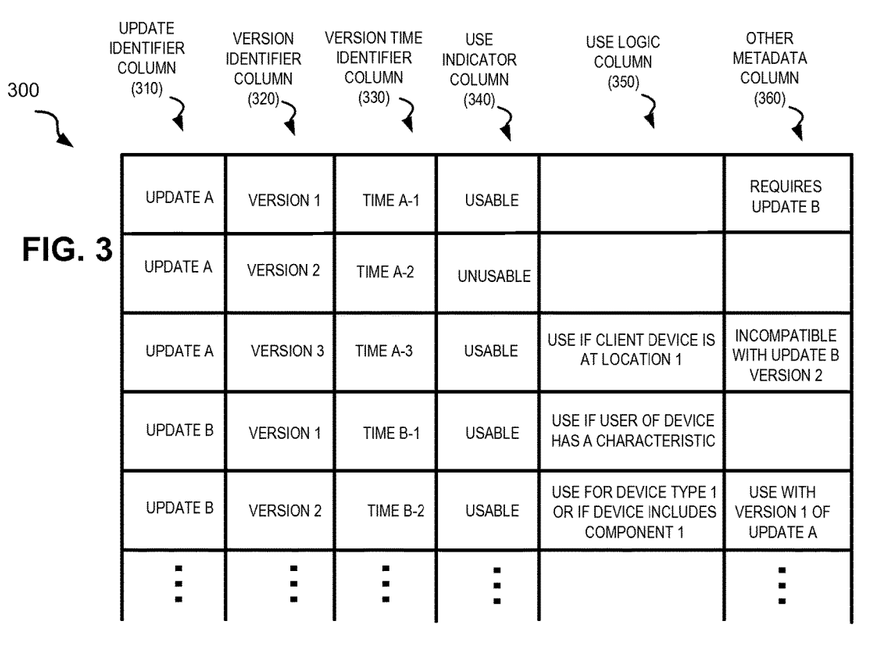
FIG. 3 is a diagram showing exemplary update metadata that may be maintained in the environment shown in FIGS. 1A-1B.

When update storage device 140 receives new update content 200, update storage device 140 may modify update metadata 144 to reflect the new update content 200. FIG. 3 shows an exemplary table 300 that may correspond to a portion of update metadata 144. In table 300, entries in each row are associated with a same version of an update, and each column presents different types of metadata associated with the update. As shown in FIG. 3, table 300 may include an update identifier column 310, a version identifier column 320, a version time identifier column 330, a use indicator column 340, a use logic column 350, and other metadata column 360. When a new version 210 of an update is received, update storage device 140 may update table 300 to include entries for storing metadata associated with the new version 210. For example, update storage device 140 may insert a row for the new version 210.

Update identifier column 310 may include data identifying software associated with an update. Additionally or alternatively, update identifier column 310 may include other information associated with an update, such as data identifying a developer, storage location, and/or creation time associated with the update, hardware effected by the update, changes implemented by the update, etc. Typically, table 300 may be organized such that different versions of the same updates are positioned in adjacent rows, with metadata associated with newer updates being positioned below data associated with older versions of the update.

Version identifier column 320 may include data identifying a version of an update identified in update identifier column 310. In the specific example shown in FIG. 3, table 300 includes data related to Versions 1-3 of Update A, and versions 1 and 2 of Update B. Entries in version identifier column 320 may further identify, for example, differences between the version and one or more prior versions, a summary of the code modified within the version, functions enabled or modified by the version, etc.

Version time identifier column 330 may identify a time when an associated version is generated by a developer and/or received by update storage device 140 (shown in FIG. 3 as Times A-1 through A-3 and B-1 through B-2). Typically, table 300 may be organized such that metadata associated with newer versions of an update (e.g., associated with later times in version time identifier column 330) are positioned in lower rows than metadata associated with older versions of the update.

As shown in FIG. 3, table 300 may further include a use indicator column 340 that includes information indicating whether a version of an update should be used (shown in FIG. 3 as "Usable" or "Unusable"). For example, an operator may insert a value for use indicator column 340 to indicate whether a version has been adequately tested and free of defects. In certain implementations, update storage device 140 may automatically insert the data in use indicator column 340. For example, when an update version update is first received, update storage device 140 may initially set an associated entry in use indicator column 340 as "unusable." Update storage device 140 may change the associated entry in use indicator column 340 to indicate that the version of the update is "usable" after receiving an instruction (e.g., a message) from an operator. Additionally, update storage device 140 may automatically (e.g., without receiving a user instruction) change the associated entry in use indicator column 340 in certain situations. For example, a version may be designated as "usable" a certain time period after the version is received, if all prior version of the update are marked as "unusable", etc. Conversely, a version may be designated as "unusable" if more than a threshold number of faults occur when the version is used by client devices 110.

Use logic column 350 may include logical rules to direct update decision device 130 to select between different usable versions of an update. For example, update decision device 130 may typically select a newest usable version (e.g., a version associated a lowest row in table 300) of an update unless otherwise indicated in use logic column 350. For example, a latest usable version of an update may be incompatible with certain hardware or software, and update decision device 130 may select an earlier usable version of the update if client device 110 includes the particular hardware or software. In other examples shown in FIG. 3, use logic column 350 may direct update decision device 130 to use an earlier usable version of an update based on, for example, attributes of client device 110 (e.g., a model of the device) or a characteristic of an associated user (e.g., account data associated with the user).

In one implementation, use indicator 340 may further indicate whether an update is "required" and/or "recommended." If an update is identified as "required" for a client device 110 (e.g., a particular client device 110 and/or a particular type, brand, model, etc. of client devices 110), use decision device 130 may select one of the versions 210 of the required update (e.g., a newest usable version of the requested update), and decision device 130 may send instructions, in update identifiers 102, that cause client device 110 to obtain the identified version of the required update during a particular time period and/or before making another actions. Conversely, if an update is identified as "recommended" for client device 110, use decision device 130 may select one of the versions 210 of the required update and send, in update identifiers 102, data identifying the selected version of the update. Client device 110 may then obtain) e.g., via update storage device 140) the identified version of the recommended update when convenient to client device 110, update storage device 140 and/or CDN 150.

In one implementation, table 300 may include a compact representation of "assignments" of desired minimal required/recommended versions 210. In this way, table 300 may be used to effectively manage "desired" states for many numerous (e.g., millions) of client devices 110. For example, use logic column 350 may store data identifying a hierarchy of "desired" states. For example, a root node may include a "default" choice and may provide assignments for managed software components (e.g., all set-top boxes (STBs) connected to an access network). At the next level, "groups" of client devices may be organized to receive versions of update 210 based on associated hardware/software (e.g., a model of the STBs). At a next level in the upgrade hierarchy, use logic column 350 may define client devices 110 associated with certain subscriber groups (e.g., STBs associated with a type of customers). A next level in the upgrade hierarchy may identify a sub-group of a subscriber group (e.g., STBs associated with certain types of customers in San Francisco). At the most specific level, use logic column 350 may identify a specific client device 110 and/or a client device 110 associated with a particular user.

To identify an update for a client device 110, update decision device 130 may navigate through the update hierarchy identified in use logic column 350. For example, update decision device 130 determine whether a client device is specifically identified in use logic column 350, and if not, update decision device 130 may traverse the update hierarchy until attributes matching client device 110 are matched. For example, if a client device 110 does not match one of the specific client device 110 identified in the update hierarchy, update decision device 130 may identify update versions 210 matching a client device 110 at a "root" or a "hardware group" level. By keeping table 300 compact and self-cleaning (by deleting older, unused versions 210), update decision device 130 may efficiently manage configurations for tens of millions of clients while keeping the number of different builds (e.g., combinations of updates) relatively small.

Table 300 may further include other metadata column 360, and update decision device 130 may select between usable versions of an update further based on entries in other metadata column 360. For example, an entry in other metadata column 360 may indicate that a version of an update must be installed together with another update (e.g., table 300 indicates that version 1 of update A requires update B). For example, a version of the update may use or otherwise require code included in another update, even if client device 110 would not use the other update. In another example, a version of an update may be compatible with only certain versions of another update and may be incompatible with a newest version of the other update.

Although FIG. 3 shows exemplary entries in table 300, in other implementations, table 300 may include fewer entries, different entries, differently arranged entries, or additional entries than those depicted in FIG. 3. Additionally or alternatively, one or more entries of table 300 may store data described as being stored by one or more other entries of table 300.

Figure 4:
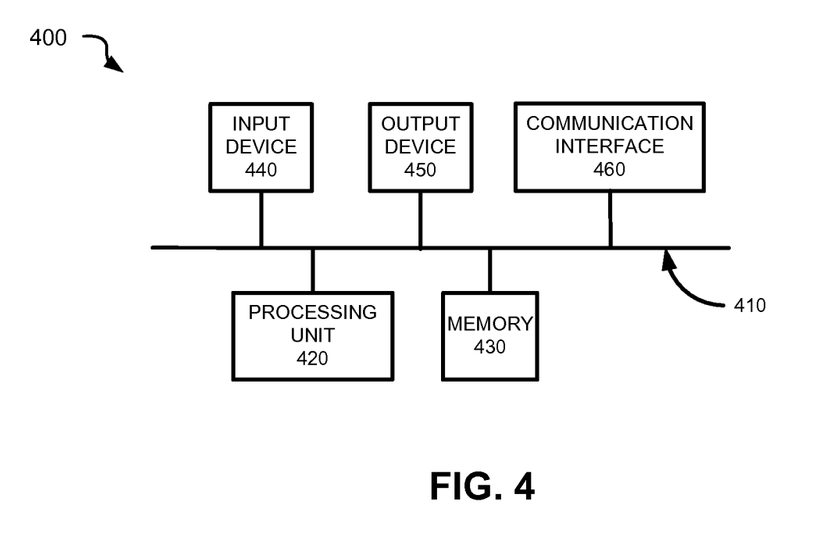
FIG. 4 is a diagram illustrating exemplary components of a computing device that may be included in the environment of FIGS. 1A-1B.

FIG. 4 is a diagram illustrating exemplary functional components of a computing device 400 according to an implementation described herein. Client device 110, an element of network 120 and/or CDN 150 (e.g., a node, router, blade, etc.), update decision device 130, and/or update storage device 140 may each include one or more devices 400. As shown in FIG. 4, device 400 may include a bus 410, a processing unit 420, a memory 430, an input unit 440, an output unit 450, and a communication interface 460.

Bus 410 may include a path that permits communication among the components of device 400. Processing unit 420 may include any type of single-core processor, multi-core processor, microprocessor, latch-based processor, and/or processing logic (or families of processors, microprocessors, and/or processing logics) that interprets and executes instructions. In other embodiments, processing unit 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processing unit 420, and/or any type of non-volatile storage device that may store information for use by processing unit 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 440 may allow an operator to input information into device 400. Input unit 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input unit 440. In other words, device 400 may be "headless" and may not include a keyboard, for example.

Output unit 450 may output information to an operator of device 400. Output unit 450 may include a display, a printer, a speaker, and/or another type of output device. For example, device 400 may include a display, which may include a liquid-crystal display (LCD) for displaying content to the customer. In some embodiments, device 400 may be managed remotely and may not include output unit 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals.

Communication interface 460 may include and/or may be coupled to an antenna for transmitting and receiving RF signals. For example, communication interface 460 may be coupled to an antenna assembly that includes one or more antennas to transmit and/or receive RF signals. The antenna assembly may, for example, receive data from communication interface 460 and transmit RF signals associated with the data, or the antenna assembly may receive RF signals and provide them to communication interface 460 to be processed.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 400 may perform certain operations, and device 400 may perform these operations in response to processing unit 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

Figure 5:
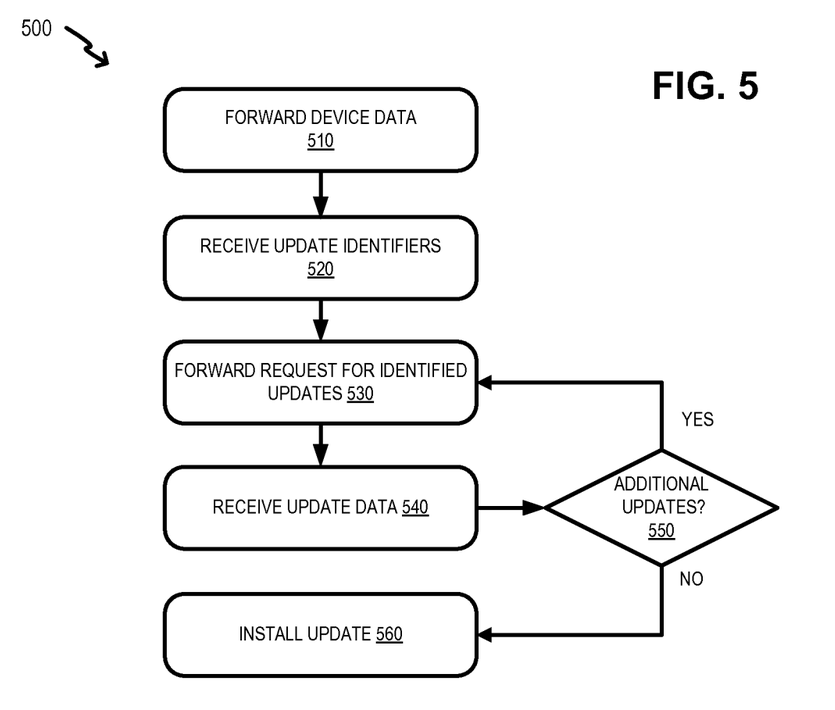
FIG. 5 is a flowchart of a process for obtaining client-specific updates in the environment of FIGS. 1A-1B.

FIG. 5 is a flowchart of a process 500 for obtaining client-specific updates 105. In some implementations, process 500 may be performed by client device 110. In other implementations, some or all of process 500 may be performed by another device or a group of devices separate from and/or including client device 110, such as update decision device 130 and/or update storage device 140.

As shown in FIG. 5, process 500 may include forwarding device metadata 101 to update decision device 130 (step 510), and receiving update identifiers 102 (step 520). Client device 110 may forward, as device metadata 101, information to update decision device 130 identifying hardware and/or software present on client device 110, versions of the software on client device, functions being performed by client device 110, attributes of client device 110 (e.g., a manufacturer, model, manufacture date, etc.) and/or information associated with a user of client device 110. For example, client device 110 may receive a dynamic extensible markup language (DXML) form from update decision device 130, and may populate the DXML form with metadata about client device 110. In another example, client device 110 may forward a first URL that includes one or more extensions associated with device metadata 101. As described in greater detail below with respect to process 600 in FIG. 6, update decision device 130 may select updates and versions of the updates for client device 110 based on the device metadata 101 and may forward update identifiers 102 naming the selected update versions.

As shown in FIG. 5, process 500 may further include client device 110 forwarding update request 104 to update storage device 140 (block 530). For example, client device 110 may generate a URL based on update identifiers 102, and client device 110 may use the URL to access the selected update versions from update storage device 140. Client device 110 may receive client-specific updates 105 from update storage device 140 (block 540). For example, client device 110 may schedule delivery of client-specific updates 105 from update storage device 140 via CDN 150.

As further shown in FIG. 5, client device 110 may determine whether additional updates are needed (block 550). For example, client device 110 may determine it needs another software update to install an update received in block 540. If no additional updates are needed (block 550-No), client device 110 may install client-specific updates 105 (block 560). Otherwise, if another updates is needed (block 550-Yes), process 500 may return to block 530 in which client device 110 may forward a request for the additional updates.

Figure 6:
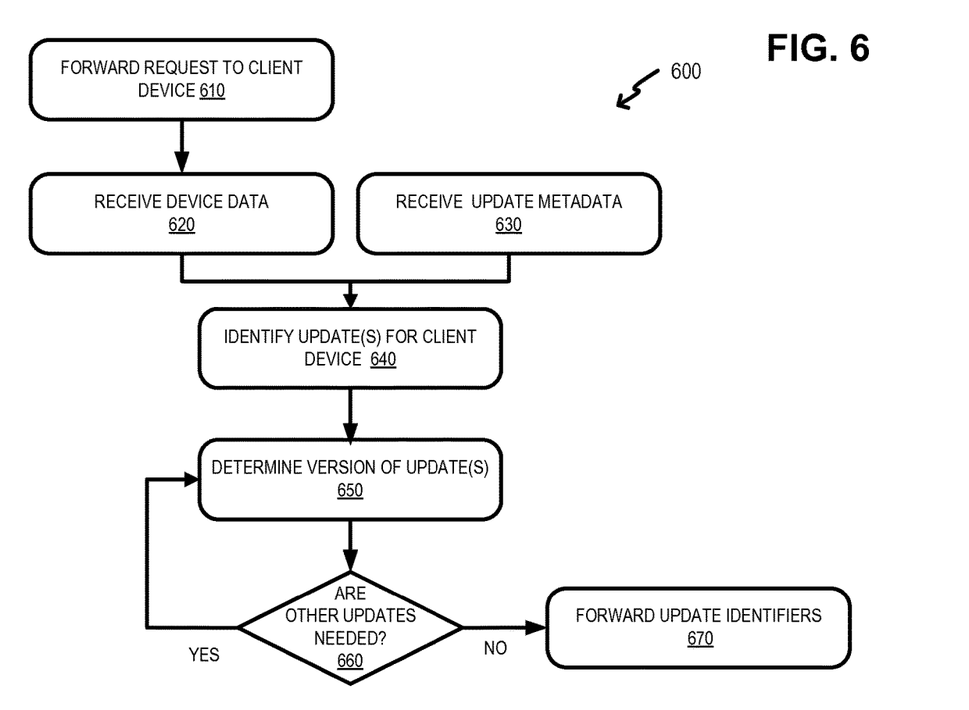
FIG. 6 is a flowchart of a process for identifying updates for a client device in the environment of FIGS. 1A-1B.

FIG. 6 is a flowchart of a process 600 for identifying updates for client device 110. In some implementations, process 600 may be performed by update decision device 130. In other implementations, some or all of process 600 may be performed by another device or a group of devices separate from and/or including update decision device 130, such as client device 110 and/or update storage device 140.

As shown in FIG. 6, process 600 may include forwarding a request to client device 110 for device metadata 101 (block 610) and receiving device metadata 101 (block 620). Process 600 may also include receiving or otherwise determining update attributes 103 from update storage device 140 (block 630). For example, update decision device 130 may parse update attributes 103 to identify attributes associated with available updates.

As shown in FIG. 6, process 600 may further include update decision device 130 identifying updates for client device 110 based on device metadata 101 and/or update attributes 103 (block 640). Update decision device 130 may request device metadata 101 that enables update decision device 130 to determine whether client device 110 should receive any of the available updates. For example, update decision device 130 may determine, based on device metadata 101, software and/or hardware included in client device 110. Update decision device 130 may further determine whether any available updates are associated with the identified software and/or hardware in client device 110.

As shown in FIG. 6, process 600 may further include update decision device 130 identifying versions of the identified updates (block 650). Update decision device 130 may identify usable versions of an update and select from the usable versions. For example, update decision device 130 may identify a newest usable version of an update. In another example, update decision device 130 may select an older usable version of the update based on an entry in use logic column 350. For example, update decision device 130 may select an older usable version of the update that is compatible with hardware and/or software of client device 110, or based on an attribute of client device 110 or an associated user. In another example, update decision device 130 may select an older usable version of the update that is compatible with another update to be installed on client device 110 (e.g., as identified in other metadata column 360).

As shown in FIG. 6, process 600 may also include determining whether other updates should be installed on client device 110 (block 660). For example, update decision device 130 may determine whether a selected version of an update requires installation of another update. For example, an update may include software that is used by client device 110 when installing another update. If no other update is needed (block 660-No), update decision device 130 may forward update identifiers 102 that includes data identifying versions of updates to be installed on client device 110 (block 670). Otherwise, if another update is needed (block 660-Yes), process 600 returns to block 650 and update decision device 130 may identify a version of the other update to be installed on client device 110.

Figure 7:
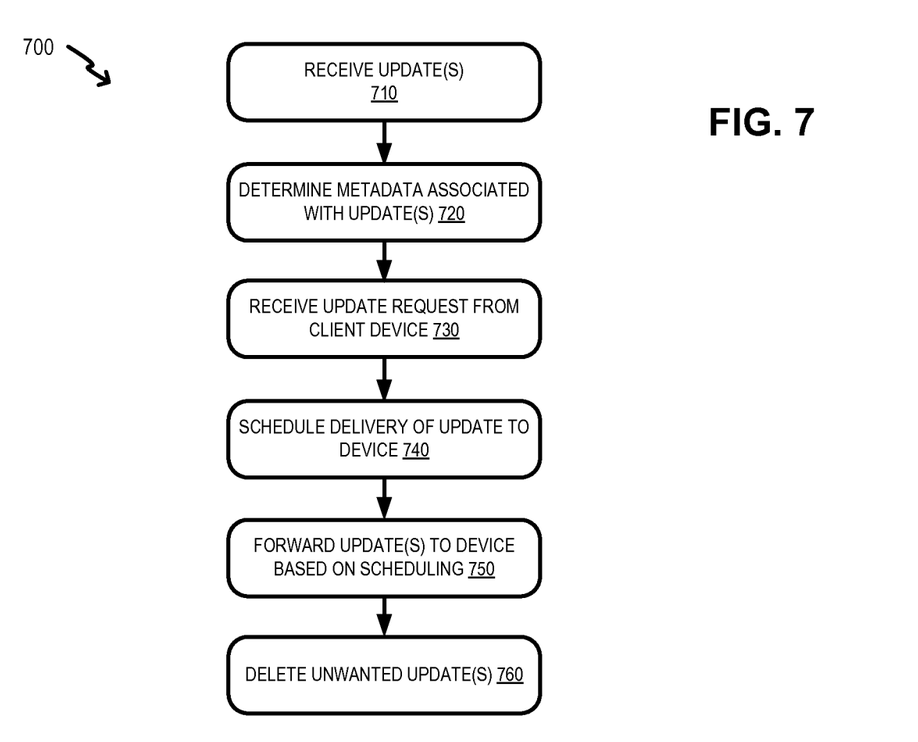
FIG. 7 shows an exemplary process for managing and distributing software updates in the environments of FIG. 1A-1B.

FIG. 7 shows an exemplary process 700 for managing and distributing software updates. In some implementations, process 700 may be performed by update storage device 140. In other implementations, some or all of process 700 may be performed by another device or a group of devices separate from and/or including update storage device 140, such as client device 110 update decision device 130, and/or a component of CDN 150.

As shown in FIG. 7, process 700 may include receiving versions 210 of updates (block 710), and determining metadata associated with the received updates (block 720). For example, update storage device 140 may receive update data 142 from a developer. In one example, update storage device 140 may request a new version of an update based on performance metrics associated with a prior version of the update. For example, update storage device 140 may forward a request for a new version of an update if more than a threshold number of failures occur during the delivery and/or installation of the prior version of the update.

Update storage device 140 may receive a portion of the update metadata 144 from the developer. For example, the developer may identify software and/or hardware related to the update, a time when the update version is generated, whether the update version is intended to replace a prior version of the update, users eligible to receive the update, whether the version of the update is usable (e.g., fully tested), types of client devices 110 compatibles with the update, etc. Update storage device 140 may further parse or otherwise analyze update data 142 to identify other update metadata 144, such as to identify the developer forwarding the update, a size of the update, a difference between the received version of the update and prior versions, etc. Update storage device 140 may further generate additional data related to an update based on feedback received from client device 110. For example, update storage device 140 may track statistics related to whether to transmission and/or installation of an update were successful.

As shown in FIG. 7, process 700 may further include update storage device 140 receiving update request 104 from client device 110 (block 730). For example, update storage device 140 may parse update request 104 to identify specific versions of updates selected by update decision device 130. Update storage device 140 may schedule delivery of the selected updates to client device 110 (block 740), and may forward the updates to client device 110 based on the scheduling (block 750). For example, update storage device 140 may determine a size of the update and identify network conditions (e.g., levels of congestion, delays, packet drops, other communications, etc.) on CDN 150. Update storage device 140 may then schedule a delivery of client-specific updates 105 at times when the network conditions satisfy one or more criteria (e.g., levels of congestion, delays, packet drops, and/or other communications, etc. are below threshold levels).

In one example, update metadata 144 may indicate whether an update is "critical." For example, update storage device 140 may determine whether an update addresses a fault that limits the operation of client device 110, solves a security flaw, etc. Update storage device 140 may schedule critical updates earlier than other, non-critical updates. For example, update storage device 140 may label data associated with the critical update with a higher quality of service (QOS) value relative to other data associated with the non-critical update. The higher QOS value may cause CDN 150 to favor the data related to the critical update. For example, CDN 150 may carry the data associated with the critical update on a higher-bandwidth path and may carry the other data associated with a non-critical update on a slower, low bandwidth path.

As shown in FIG. 7, process 700 may further include automatically (e.g., without receiving a user input) deleting unwanted versions of updates (block 760). For example, update storage device 140 may identify and delete versions of updates that have been stored more than a threshold length of time. In another example, update storage device 140 may automatically delete update versions that have been marked as "unusable" and/or versions that have not been requested during a threshold time period. In yet another example, update storage device 140 may identify and delete an older version of an update when update data 142 includes more than a threshold number of versions of the update.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to processes 500, 600, and 700 of FIGS. 5-7, the order of the blocks and/or signals in processes 500, 600, and 700 may be modified in other implementations. Further, non-dependent blocks and/or signals in processes 500, 600, and 700 may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a processor associated with a first device, first data from a second device, wherein the first data identifies one or more attributes associated with the second device;
selecting, by the processor and based on the one or more attributes, a software update from a repository that includes a plurality of software updates, wherein the repository further includes a plurality of versions of the software update;
determining, by the processor, metadata associated with the plurality of versions of the software update, wherein the metadata identifies two or more versions of the software update of the plurality of versions of the software update that are marked as usable based on update attributes for identifying the two or more versions and logic rules for selecting usable versions of the plurality of versions of the software update, wherein the two or more versions of the software update includes a first version of the software update and a second version of the software update, wherein the first version of the software update is generated before the second version of the software update;

selecting, by the processor, a version of the two or more versions of the software update for the second device, wherein selecting the version for the second device includes:
performing a lookup in a table, wherein the table stores information about each version of each software update of the plurality of software updates in a plurality of metadata columns, wherein the plurality of metadata columns comprise an update identifier column, a version identifier column, a version time identifier column, a usability indicator column, a use logic column, and an other metadata column, wherein the other metadata column includes entries indicating whether a selected version of a software update must be installed with an additional software update without requiring subsequent use of the additional software update;
navigating an update hierarchy in the use logic column to determine whether the second device is specifically identified in the use logic column of a third version of the software update of the plurality of versions of the software update;
if the second device is specifically identified in the use logic column of the third version of the software update and complies with all other criteria in the plurality of metadata columns, selecting the third version of the software update as the selected version for use by the second device;
if the second device is not specifically identified in the use column of the third version of the software update, selecting a fourth version of the software update as the selected version for use by the second device, wherein the fourth version of the software update matches the second device at a root or hardware group level and complies with all the other criteria of the plurality of metadata columns;
determining, by the processor and based on the table, whether the additional software update is to be used by the second device when installing the selected version of the software update;
and
forwarding, by the processor, second data to the second device, wherein the second data identifies the selected version of the software update, wherein the second device uses the second data to obtain the selected version of the software update, and wherein the second data includes information identifying the additional software update when the additional software update is to be used by the second device when installing the third version of the software update or installing the fourth version of the software update.

2. The method of claim 1, further comprising:
forwarding a request to the second device for the one or more attributes, wherein the first data is received from the second device that generates the first data based on the forwarded request.

3. The method of claim 1, wherein the repository further includes a plurality of versions of the additional software update, and wherein the method further comprises:
determining metadata associated with the plurality of versions of the additional software update, wherein the metadata associated with the plurality of versions of the additional software update identifies two or more versions of the additional software update, of the plurality of versions of the additional software update, that are marked as usable;
selecting a version, of the two or more versions of the additional software update, that is compatible with the second device and the selected version of the software update; and
including, in the second data, information identifying the selected version of the additional software update.

4. The method of claim 1, wherein the metadata associated with the plurality of versions of the software update identify times when the plurality of versions of the software update were at least one of generated or added to the repository, and wherein the method further comprises:
identifying, based on the associated times, an oldest version of the plurality of versions of the software update; and
causing the oldest version of the software update to be removed from the repository.

5. The method of claim 1, wherein the second data includes a uniform resource locator that identifies a storage location associated with the selected version of the software update.

6. The method of claim 1, wherein the second device obtains the selected version of the software update via a content delivery network (CDN), and wherein the method further comprises:
identifying an attribute of the CDN, wherein the attribute includes at least one of a congestion level on the CDN, available bandwidth on the CDN, or transmission delays on the CDN; and
scheduling transmission of the selected version of the software update via the CDN to the second device based on the attribute of the CDN.

7. A first device comprising:
a memory configured to store instructions; and
a processor configured to execute one or more of the instructions to:
receive first data from a second device, wherein the first data identifies one or more attributes associated with the second device;
select, based on the one or more attributes, a software update from a repository that includes a plurality of software updates, wherein the repository further includes a plurality of versions of the software update;
determine metadata associated with the plurality of versions of the software update, wherein the metadata identifies two or more versions of the software update of the plurality of versions of the software update that are marked as usable based on update attributes for identifying the two or more versions and logic rules for selecting usable versions of the plurality of versions of the software update, wherein the two or more versions of the software update includes a first version of the software update and a second version of the software update, wherein the first version of the software update is generated before the second version of the software update;
select a version of the two or more versions of the software update for the second device, wherein the processor, when selecting the version for the second device, is further configured to:
perform a lookup in a table, wherein the table stores information about each version of each software update of the plurality of software updates in a plurality of metadata columns, wherein the plurality of metadata columns comprise an update identifier column, a version identifier column, a version time identifier column, a usability indicator column, a use logic column, and an other metadata column, wherein the other metadata column includes entries indicating whether a selected version of a software update must be installed with an additional software update without requiring subsequent use of the additional software update;

navigate an update hierarchy in the use logic column to determine whether the second device is specifically identified in the use logic column of a third version of the software update of the plurality of versions of the software update;

if the second device is specifically identified in the use logic column of the third version of the software update and complies with all other criteria in the plurality of metadata columns, select the third version of the software update as the selected version for use by the second device;

if the second device is not specifically identified in the use logic column of the third version of the software update, select a fourth version of the software update as the selected version for use by the second device, wherein the fourth version of the software update matches the second device at a root or hardware group level and complies with all the other criteria of the plurality of metadata columns;

determine, based on the table, whether the additional software update is to be used by the second device when installing the selected version of the software update; and forward second data to the second device, wherein the second data identifies the selected version of the software update, wherein the second device uses the second data to obtain the selected version of the software update, and wherein the second data includes information identifying the additional software update when the additional software update is to be used by the second device when installing the third version of the software update or installing the fourth version of the software update.

8. The first device of claim 7, wherein the processor is further configured to execute one or more of the instructions to:
forward a request to the second device for the one or more attributes, wherein the first data is received from the second device that generates the first data based on the forwarded request.

9. The first device of claim 7, wherein the repository further includes a plurality of versions of the additional software update, and wherein the processor is further configured to execute one or more of the instructions to:
determine metadata associated with the plurality of versions of the additional software update, wherein the metadata associated with the plurality of versions of the additional software update identifies two or more versions of the additional software update, of the plurality of versions of the additional software update, that are marked as usable;
select a version, of the two or more versions of the additional software update, that is compatible with the second device and the selected version of the software update; and
include, in the second data, information identifying the selected version of the additional software update.

10. The first device of claim 7, wherein the metadata associated with the plurality of versions of the software update identify times when the plurality of versions of the software update were at least one of generated or added to the repository, and wherein the processor is further configured to execute one or more of the instructions to:
identify, based on the associated times, an oldest version of the plurality of versions of the software update; and
cause the oldest version of the software update to be removed from the repository.

11. The first device of claim 7, wherein the second data includes a uniform resource locator that identifies a storage location associated with the selected version of the software update.

12. The first device of claim 7, wherein the second device obtains the selected version of the software update via a content delivery network (CDN), and wherein the processor is further configured to execute one or more of the instructions to:
identify an attribute of the CDN, wherein the attribute includes at least one of a congestion level on the CDN, available bandwidth on the CDN, or transmission delays on the CDN; and
schedule transmission of the selected version of the software update via the CDN to the second device based on the attribute of the CDN.

13. A non-transitory computer-readable medium, comprising:
a plurality of computer-executable instructions stored thereon, which, when executed by a processor associated with a first device, cause the processor to:
receive first data from a second device, wherein the first data identifies one or more attributes associated with the second device;
select, based on the one or more attributes, a software update from a repository that includes a plurality of software updates, wherein the repository further includes a plurality of versions of the software update;
determine metadata associated with the plurality of versions of the software update, wherein the metadata identifies two or more versions of the software update of the plurality of versions of the software update that are marked as usable based on update attributes for identifying the two or more versions and logic rules for selecting usable versions of the plurality of versions of the software update, wherein the two or more versions of the software update includes a first version of the software update and a second version of the software update, wherein the first version of the software update is generated before the second version of the software update;
select a version of the two or more versions of the software update for the second device, wherein processor, when selecting the version for the second device, is further configured to:
perform a lookup in a table, wherein the table stores information about each version of each software update of the plurality of software updates in a plurality of metadata columns, wherein the plurality of metadata columns comprise an update identifier column, a version identifier column, a version time identifier column, a usability indicator column, a use logic column, and an other metadata column, wherein the other metadata column includes entries indicating whether a selected version of a software update must be installed with an additional software update without requiring subsequent use of the additional software update;

navigate an update hierarchy in the use logic column to determine whether the second device is specifically identified in the use logic column of a third version of the software update of the plurality of versions of the software update;

if the second device is specifically identified in the use logic column of the third version of the software update and complies with all other criteria in the plurality of metadata columns, select the third version of the software update as the selected version for use by the second device;

if the second device is not specifically identified in the use logic column of the third version of the software update, select a fourth version of the software update as the selected version for use by the second device, wherein the fourth version of the software update matches the second device at a root or hardware group level and complies with all the other criteria of the plurality of metadata columns;

determine, based on the table, whether the additional software update is to be used by the second device when installing the selected version of the software update; and forward second data to the second device, wherein the second data identifies the selected version of the software update, wherein the second device uses the second data to obtain the selected version of the software update, and wherein the second data includes information identifying the additional software update when the additional software update is to be used by the second device when installing the third version of the software update or installing the fourth version of the software update.

14. The non-transitory computer-readable medium of claim 13, wherein the repository further includes a plurality of versions of the additional software update, and wherein the plurality of computer-executable instructions further cause the processor to:

determine metadata associated with the plurality of versions of the additional software update, wherein the metadata associated with the plurality of versions of the additional software update identifies two or more versions of the additional software update, of the plurality of versions of the additional software update, that are marked as usable;

select a version, of the two or more versions of the additional software update, that is compatible with the second device and the selected version of the software update; and include, in the second data, information identifying the selected version of the additional software update.

15. The non-transitory computer-readable medium of claim 13, wherein the metadata associated with the plurality of versions of the software update identify times when the plurality of versions of the software update were at least one of generated or added to the repository, and wherein the plurality of computer-executable instructions further cause the processor to:

identify, based on the associated times, an oldest version of the plurality of versions of the software update; and cause the oldest version of the software update to be removed from the repository.

16. The non-transitory computer-readable medium of claim 13, wherein the second data includes a uniform resource locator that identifies a storage location associated with the selected version of the software update.

17. The non-transitory computer-readable medium of claim 13, wherein the second device obtains the selected version of the software update via a content delivery network (CDN), and wherein the plurality of computer-executable instructions further cause the processor to:

identify an attribute of the CDN, wherein the attribute includes at least one of a congestion level on the CDN, available bandwidth on the CDN, or transmission delays on the CDN; and schedule transmission of the selected version of the software update via the CDN to the second device based on the attribute of the CDN.

* * * * *